United States Patent Office 2,849,491
Patented Aug. 26, 1958

2,849,491

6,8-DIMETHYL-5-NONEN-2-ONE

Joseph Donald Surmatis, West Caldwell, N. J., assignor to Hoffmann-La Roche Inc., Nutley, N. J., a corporation of New Jersey No Drawing. Original application December 7, 1954, Serial No. 473,726, now Patent No. 2,806,887, dated September 17, 1957. Divided and this application March 26, 1957, Serial No. 648,517

1 Claim. (Cl. 260—593)

This invention relates to novel chemical compounds having utility in the perfume and cosmetic industries, for example as odor-imparting agents and as intermediates for odor-imparting agents; and to novel intermediates and novel processes useful in preparing said compounds. An important aspect of the invention relates to the novel compound 3,7,9-trimethyl-1,6-decadien-3-ol. Because of its pleasant fragrance, this compound is useful as an odor-imparting agent in the preparation of perfumes and of scented compositions generally This application is a division of my copending application Serial No. 473,726, filed December 7, 1954, which was issued on September 17, 1957, as Patent No. 2,806,887.

In one comprehensive embodiment, the invention provides a process for converting the known starting material 3,5-dimethyl-1-hexen-3-ol to the novel compound identified above, which comprises the steps of halogenating 3,5-dimethyl-1-hexen-3-ol to produce 1-halo-3,5-dimethyl-2-hexene, condensing the latter with an acetoacetic acid ester and subjecting the condensation product to ketonic scission to produce 6,8-dimethyl-5-nonen-2-one, condensing the latter with acetylene to produce 3,7,9-trimethyl-1-decyn-6-en-3-ol, and hydrogenating the latter to produce 3,7,9-trimethyl-1,6-decadien-3-ol.

A preferred method of executing this aspect of the invention comprises the steps of: reacting 3,5-dimethyl-1-hexen-3-ol with a concentrated aqueous solution of a hydrohalic acid (such as commercial concentrated aqueous hydrochloric acid of about 37% by weight HCl concentration and commercial concentrated aqueous hydrobromic acid of about 48% by weight HBr concentration) thereby producing the corresponding 1-halo-3,5-dimethyl-2-hexene; condensing the latter with a lower alkyl acetoacetate (such as ethyl acetoacetate or methyl acetoacetate) in the presence of an alkali metal condensation agent (such as sodium) or alternatively in the presence of a corresponding alkali metal lower alkoxide (such as sodium methoxide) and decarboxylating the resulting 3-lower carbalkoxy-6,8-dimethyl-5-nonen-2-one (for example, by saponifying with an aqueous solution of an alkali metal hydroxide and subsequently acidifying) thereby producing 6,8-dimethyl-5-nonen-2-one; condensing the latter with acetylene (for example, by reacting with acetylene in liquid ammonia in the presence of an alkali metal condensation agent) thereby producing 3,7,9-trimethyl-1-decyn-6-en-3-ol; and partially hydrogenating the latter (for example, by reducing with elemental hydrogen in the presence of a hydrogenation catalyst selective to catalyze the hydrogenation of an acetylenic bond preferentially to an olefinic bond) thereby producing 3,7,9-trimethyl-1,6-decadien-3-ol. Selective hydrogenation catalysts of the kind referred to are already known, e. g. see Lindlar, Helvetica Chimica Acta 35, 446 (1952).

The illustrative mode of procedure disclosed above can be traced with reference to the following schematic flow sheet:

FLOW SHEET

I  3,5-dimethyl-1-hexen-3-ol

II  1-halo-3,5-dimethyl-2-hexene

III  3-lower carbalkoxy-6,8-dimethyl-5-nonen-2-one

IV  6,8-dimethyl-5-nonen-2-one

V  3,7,9-trimethyl-1-decyn-6-en-3-ol

VI  3,7,9-trimethyl-1,6-decadien-3-ol

The novel compounds 6,8-dimethyl-5-nonen-2-one and 3,7,9-trimethyl-1,6-decadien-3-ol are useful for incorporation in perfume compositions and other types of scented compositions, in order to impart the characteristic fragrance of these compounds to said compositions.

Certain of the compounds of the invention are capable of exhibiting optical isomerism and geometric isomerism. It should be understood that the invention includes all of the stereoisomeric forms of the novel compounds comprised in the foregoing flow sheet. The invention is limited only by the claim.

The invention is further disclosed in the following examples, which are illustrative but not limitative thereof:

Example 1

438 grams of 3,5-dimethyl-1-hexen-3-ol was stirred with 1500 cc. of concentrated aqueous hydrochloric acid (37% by weight HCl concentration) at room temperature for 30 minutes. The oil layer was separated, washed twice, each time with 500 cc. of water, and dried over calcium chloride. The product obtained, 1-chloro-3,5-dimethyl-2-hexene, had $n_D^{25} = 1.448$.

Example 2

In a five-liter flask there was placed three liters of benzene, 429 g. of ethyl acetoacetate and 162 g. of sodium methylate. 428 g. of the product of Example 1, 1-chloro-3,5-dimethyl-2-hexene, was added at 60° C. within 30 minutes, and stirring was continued for six hours at 60–70° C. The reaction mixture was washed with two liters of water and the benzene was distilled off under a vacuum of 100 mm. to yield 3-carbethoxy-6,8-dimethyl-5-nonen-2-one as a straw-colored oil.

Example 3

The entire quantity of 3-carbethoxy-6,8-dimethyl-5-nonen-2-one produced in Example 2 was dissolved in 2 liters of ethyl alcohol. To this was added 200 g. of solid potassium hydroxide and 200 cc. of water. The mixture was stirred for four hours at 40–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 cc. of benzene. The combined oils were washed neutral with water and fractionated. The product 6,8-dimethyl-5-nonen-2-one distilled at 120° C. at 35 mm., $n_D^{25}=1.4432$. It had a pleasant fruity odor reminiscent of fresh apple juice. The 2,4-dinitrophenylhydrazone derivative melted at 47° C. The semicarbazone derivative melted at 114° C.

*Example 4*

In 1.5 liters of liquid ammonia there was dissolved 41.4 g. of metallic sodium. Acetylene gas was passed into the blue colored solution, until the color changed to white. The addition of acetylene was continued for an extra 30 minutes. Then a solution of 252 grams of 6,8-dimethyl-5-nonen-2-one, dissolved in 250 cc. of ethyl ether, was dropped in within 45 minutes. The stirring was continued for 15 hours while a slow stream of acetylene was bubbled into the reaction mixture.

The ammonia was thereupon evaporated from the reaction mixture with the aid of a slow stream of nitrogen. The residue was poured into two liters of 5% sulfuric acid. The oil layer was removed and washed neutral with water. On fractionation, 3,7,9-trimethyl-1-decyn-6-en-3-ol was obtained in a fraction distilling at 72° C. at 0.35 mm., $n_D^{25}=1.4598$.

*Example 5*

189 g. of 3,7,9-trimethyl-1-decyn-6-en-3-ol was diluted with an equal volume of petroleum ether and placed in a flask with 18.9 g. of 5% lead-palladium-on-calcium carbonate catalyst (Lindlar, above cited). This was hydrogenated at one atmosphere gauge hydrogen pressure until 0.97 mol of hydrogen was consumed. On fractionation of the reaction mixture, there was obtained 3,7,9-trimethyl-1,6-decadien-3-ol, distilling at 129° C. at 20 mm., $n_D^{25}=1.4592$. The product has a woody, floral fragrance reminiscent of lily of the valley, and can be used as a perfume base to impart this fragrance to perfume compositions of the muguet, lilac and rose type.

I claim:

6,8-dimethyl-5-nonen-2-one.

References Cited in the file of this patent

UNITED STATES PATENTS

| | | |
|---|---|---|
| 2,589,275 | Naves | Mar. 18, 1952 |
| 2,766,289 | Lacey | Oct. 9, 1956 |

OTHER REFERENCES

Simonsen, The Terpenes, vol. I (2nd Ed.), pp. 86–87 (1947).